US009609022B2

(12) United States Patent
Gupta et al.

(10) Patent No.: US 9,609,022 B2
(45) Date of Patent: Mar. 28, 2017

(54) CONTEXT BASED DYNAMICALLY SWITCHING DEVICE CONFIGURATION

(71) Applicants: Keshav Gupta, Bangalore (IN); Hemanth Basrur, Bangalore (IN); Sumanth Mamidi, Sattenapalli (IN)

(72) Inventors: Keshav Gupta, Bangalore (IN); Hemanth Basrur, Bangalore (IN); Sumanth Mamidi, Sattenapalli (IN)

(73) Assignee: SYBASE, INC., Dublin, CA (US)

( * ) Notice: Subject to any disclaimer, the term of this patent is extended or adjusted under 35 U.S.C. 154(b) by 0 days.

(21) Appl. No.: 14/565,424

(22) Filed: Dec. 10, 2014

(65) Prior Publication Data

US 2016/0173531 A1    Jun. 16, 2016

(51) Int. Cl.
*H04L 29/06* (2006.01)
*H04L 29/08* (2006.01)
*H04L 12/24* (2006.01)
*H04W 12/08* (2009.01)
*G07C 9/00* (2006.01)

(52) U.S. Cl.
CPC .......... *H04L 63/20* (2013.01); *G07C 9/00309* (2013.01); *G07C 9/00571* (2013.01); *H04L 41/0806* (2013.01); *H04L 67/306* (2013.01); *H04W 12/08* (2013.01); *G07C 2009/00825* (2013.01)

(58) Field of Classification Search
CPC ..... H04L 63/20; H04L 67/306; H04L 63/105; H04L 41/0806; G07C 9/00007; G07C 9/00309; G07C 9/00571; H04W 12/08
See application file for complete search history.

(56) References Cited

U.S. PATENT DOCUMENTS 7,591,006 B2    9/2009  Werner
7,786,866 B2    8/2010  Berthold
(Continued)

FOREIGN PATENT DOCUMENTS

EP        2592601 A1    5/2013
EP        2725823 A1    4/2014
IL    WO 2013011512 A1 *  1/2013  ........... H04L 63/107

OTHER PUBLICATIONS

Schwarz et al., Digital Camera Detection and Image Disruption Using Controlled Intentional Electromagnetic Interference, Apr. 2012, IEEE Transactions on Electromagnetic Compatibility, vol. 54, Issue 5, pp. 1048-1054.*

*Primary Examiner* — Kenneth Chang

(57) ABSTRACT

Various embodiments of systems and methods for dynamically switching device configuration based upon context are described herein. In an aspect, the method includes reading a tag attached to an entry gate of a restricted area through a device. Upon reading the tag, an application is executed to connect the device to a mobile device management (MDM) server. Upon establishing the connection, the restricted area identifier (ID) is sent to the MDM server. The device receives one or more policies applicable for the restricted area from the MDM server. The received one or more policies are executed on the device to change the device configuration. After execution, the device sends a confirmation message to the MDM server to indicate that the device is policy complaint. Upon receiving the confirmation, the MDM server instructs to open the entry gate to allow the device within the restricted area.

20 Claims, 8 Drawing Sheets

(56) References Cited

U.S. PATENT DOCUMENTS

| | | | |
|---|---|---|---|
| 8,218,828 B2 | 7/2012 | Iasso | |
| 8,478,196 B1 | 7/2013 | Hewinson | |
| 8,774,714 B2 | 7/2014 | Metivier | |
| 8,838,783 B2 | 9/2014 | Luna et al. | |
| 8,971,927 B2* | 3/2015 | Zhou | H04W 48/04 455/414.2 |
| 2004/0198306 A1* | 10/2004 | Singh | H04M 1/66 455/345 |
| 2007/0094716 A1* | 4/2007 | Farino | G07C 9/00103 726/5 |
| 2007/0186106 A1* | 8/2007 | Ting | H04L 63/104 713/168 |
| 2007/0206797 A1 | 9/2007 | Chan et al. | |
| 2008/0209505 A1* | 8/2008 | Ghai | G06F 21/55 726/1 |
| 2009/0072946 A1 | 3/2009 | von Reischach et al. | |
| 2009/0322890 A1* | 12/2009 | Bocking | G03B 17/00 348/211.2 |
| 2010/0125891 A1* | 5/2010 | Baskaran | G06F 21/6218 726/1 |
| 2010/0201482 A1* | 8/2010 | Robertson | G07C 9/00111 340/5.61 |
| 2012/0280790 A1 | 11/2012 | Gerhardt et al. | |
| 2013/0095802 A1 | 4/2013 | Wang | |
| 2013/0097682 A1* | 4/2013 | Zeljkovic | H04L 9/3231 726/7 |
| 2013/0124346 A1 | 5/2013 | Baldwin et al. | |
| 2013/0342314 A1 | 12/2013 | Chen et al. | |
| 2014/0097243 A1 | 4/2014 | Luo | |
| 2015/0042449 A1* | 2/2015 | Suh | G07C 9/00111 340/5.7 |

\* cited by examiner

US 9,609,022 B2

CONTEXT BASED DYNAMICALLY SWITCHING DEVICE CONFIGURATION

BACKGROUND

Device configuration refers to activated and/or deactivated features of a device. The features include, but are not limited to, camera, internet connectivity, sound recorder, radio, etc. The device configuration may be required to be changed based upon the context such as geographical location, temperature, etc. For example, the device configuration may be required to be changed for a restricted area, such as a server room, of an organization. Usually, the device configuration is verified or changed manually, e.g., by a security guard. The security guard may, e.g., put sticker on a camera of the device or might keep the device with him based upon the security policy of the restricted area. The manual verification or re-configuration of the device might be costly, time consuming, and prone to human errors.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Figure 1:
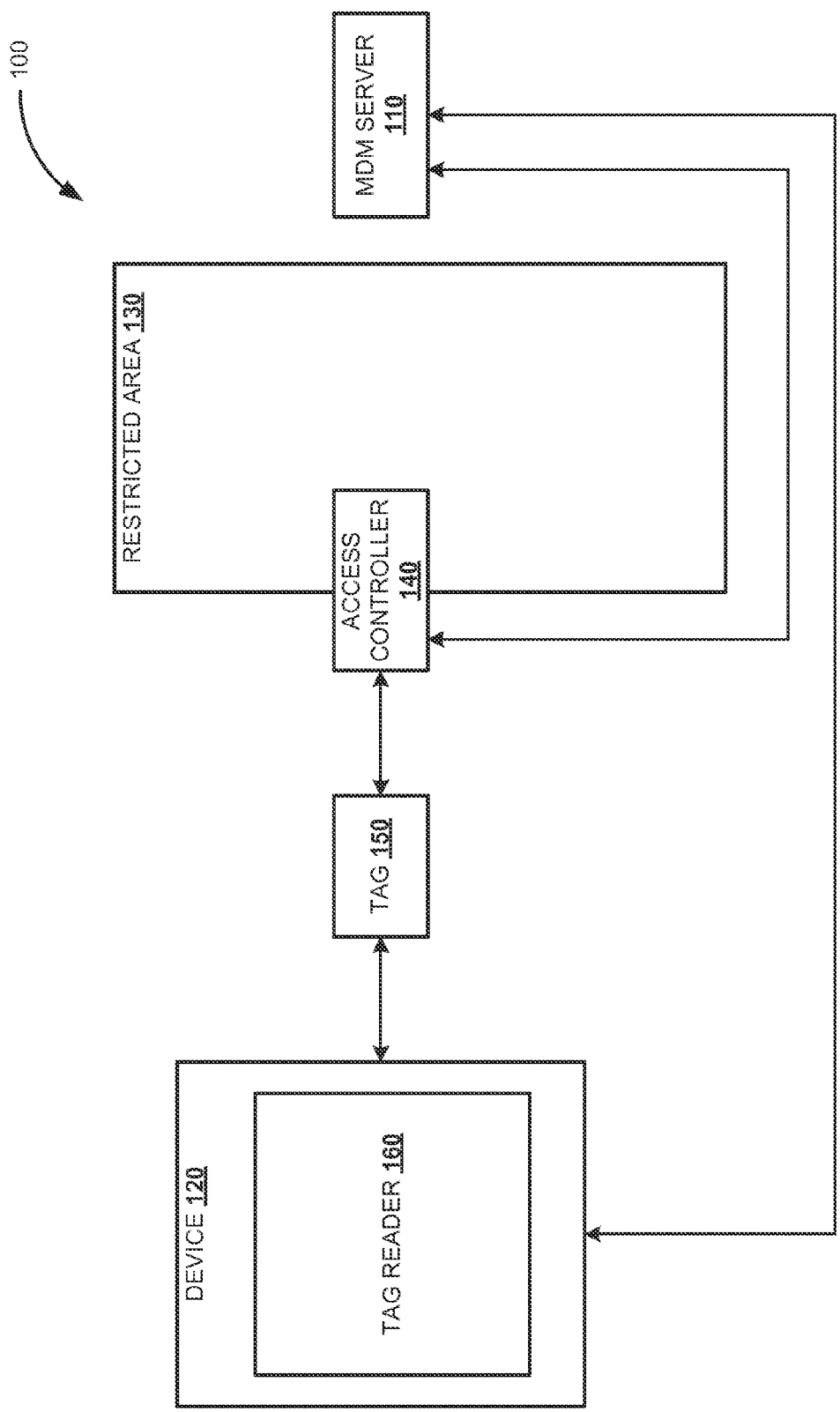
FIG. 1 is a block diagram illustrating an exemplary device configuring environment including a mobile device management (MDM) server for configuring devices based upon context, according to an embodiment.

Embodiments of techniques for context based dynamically switching device configuration are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Device" refers to a logical and/or a physical unit adapted for a specific purpose. For example, a device may be at least one of a mechanical and an electronic unit. Device encompasses, but is not limited to, a communication device, a computing device, a handheld device, and a mobile device such as an enterprise digital assistant (EDA), a personal digital assistant (PDA), a tablet computer, a smartphone, and the like. A device can perform one or more tasks. The device can access internet services such as World Wide Web (www) or electronic mails (E-mails), and exchange information with another device or a server by using wired or wireless technologies, e.g. Bluetooth, Wi-Fi, Universal Serial Bus (USB), infrared and the like.

"Device configuration" refers to activated features of a device. Device features include, but are not limited to, camera, internet connectivity, sound recorder, radio, etc. The device configuration determines the functional behavior of the device. The device configuration may be changed or switched by activating or deactivating one or more device features. The device configuration may be required to be changed based upon area specific policy/rules specified for an area where the device is positioned.

"Contextual information" or "context-based information" refers to information in context of device configuration. The "contextual information" can be geographic such as location or it can be environmental such as temperature variation, etc. Change in "contextual information" can influence change in configuration of the device or access given to the user. Different area specific policies or rules may be defined for configuring the device or changing its configuration based upon the "contextual information."

"Restricted area" refers to an area in which security or restrictive measures are employed to prevent unauthorized entry. For example, a server room within an organization may be a restricted area. An area specific policy may be specified for a corresponding "restricted area." For example, the area specific policy may be to switch off device camera and radio within the server room. The area may be secured or restricted using an access controller at an entry point of the area.

"Access controller" refers to a physical barrier such as a lock and/or an indicative barrier such as an audio siren that raises an alarm when a user enters the restricted area. In various embodiments, the access controller may refer to an imaginary boundary, for example a geo-fence, surrounding the restricted area such that a device has a signal drop when a user enters the boundaries of the restricted area demarcated by the access controller.

"Tag" refers to a label attached to an entity for purpose of identification. A tag may be attached to an entry point of a restricted area. For example, the tag may be attached to an access controller or a lock of the entry point of the restricted area. In an embodiment, the tag may be any physical object such as a chip, a sticker, etc. For example, the tag may be one of a near field communication (NFC) tag, a bar code, a matrix barcode or two-dimensional bar code, a quick response (QR) code, a radio-frequency identification (RFID) tag, etc. The tag is for the purpose of identification of the restricted area. The tag may be configurable and may store information and/or instruction configured by a user. For example, the tag includes information such as a name/identifier (ID) of the area restricted by the access controller (e.g., lock). The tag may also include a command for performing some task. For example, the tag might include a command to instruct the device to install or download an application from cloud or execute the application.

"Tag reader" refers to a physical and/or a logical unit which can read information and instruction from a tag. For example, a tag reader may be a sensor which can read information from a bar code (tag). The tag reader is an intermediary between the tag and the device. The tag reader provides or sends the information or command read from the tag to the device or operating system (OS) of the device. The device or the OS of the device can perform operation(s) based upon the received information and/or command. There are different types of tag readers corresponding to different types of tags. For example, the tag readers such as sensors may include NFC reader, a bar code reader, a QR reader, an RFID reader, etc.

FIG. 1 is a block diagram illustrating exemplary device configuring environment 100 including mobile device management (MDM) server 110 for configuring or reconfiguring device 120 based upon context. Reconfiguring a device refers to switching between different device configurations. The context may be related to geographical or environmental factor. For example, the context may be related to location such as an office premise or a restricted area within the office premise. A restricted area, e.g., restricted area 130, may be secured, e.g., by placing the access controller 140 (e.g., lock) at an entry point (e.g., a gate or a door) of the restricted area 130.

Tag 150 is attached to the access controller 140. The tag 150 may be configurable and may be preconfigured by an administrator with information corresponding to the restricted area which is secured by the tag/access controller. For example, the tag 150 may include information such as a name or an identifier (ID) of the restricted area 130. The tag 150 may also be configured to include a command or instruction. The tag 150 can be read by tag reader 160. In an embodiment, reading a tag refers to reading the information and instructions included within the tag. The tag reader 160 may be installed or downloaded on the device 120. When a user carrying the device 120 swipes the device 120 at the entry point, the tag reader 160 reads the tag 150.

For example, the tag reader 160 reads the restricted area identifier (ID) and a command for downloading and/or launching an application. The tag reader 160 sends the information (e.g., area ID) and the command to operating system (OS) of the device 120. The OS of the device 120 executes the command. The command may be, e.g., to execute an application to get connected (communicatively coupled) to the MDM server 110. Once the command is executed by the OS, the device 120 gets connected to the MDM server 110. Upon connection, the device 120 sends information (e.g., restricted area ID) to the MDM server 110. The MDM server 110 identifies the restricted area 130 through the received restricted area ID. Upon identifying the restricted area 130, the MDM server 110 retrieves one or more area specific policies predefined for the restricted area 130. The area specific policies include rules for defining the configuration(s) of the device to allow the device to access the restricted area.

The MDM server 110 sends the area specific policies related to the restricted area 130 to the device 120. Based upon the received area specific policies, the OS reconfigures the device 120. Once the reconfiguration is done (e.g., device internet connectivity is switched off and device camera is disabled), the device 120 sends a confirmation message to the MDM server 110. The confirmation message indicates that the area specific policies are applied on the device 120 and the device 120 is complaint with the restrictions. Upon receiving the confirmation message, the MDM server 110 sends instruction to open the access controller 140 to allow the user to access the restricted area 130 along with the device 120.

The user may be an employee of an organization. The user is registered and is assigned an identifier (ID). In an embodiment, a user database (e.g., an active directory) may be maintained by the organization where the information related to the registered users of the organization is stored. The user database may include information such as name, age, designation. ID, etc., of the users. In an embodiment, the user database may also be stored as MDM database. The user database is accessible by the MDM server.

The user may be required to enroll or register his or hers device(s), e.g., a smartphone owned or carried by the user. A device is registered or enrolled with the MDM server. For registration, the information to uniquely identify the device is provided to the MDM server. For example, when the device is a smart phone, an international mobile station equipment identity (IMEI) number and/or a unique device identifier (UDID) number is provided to the MDM server. In an embodiment, the information may be automatically retrieved from the device, e.g., from the OS of the device. The MDM server may automatically retrieve the information from the OS of the device once the device is connected to the MDM server. In an embodiment, the OS itself provides the information to the MDM server. For example, when the device is a smartphone, the OS of the smartphone provides the IMEI and/or the UDID number of the smartphone to the MDM server. In an embodiment, the information may be provided by the user owning the device. In an embodiment, various other information related to the device may also be sent to the MDM server.

Figure 2:
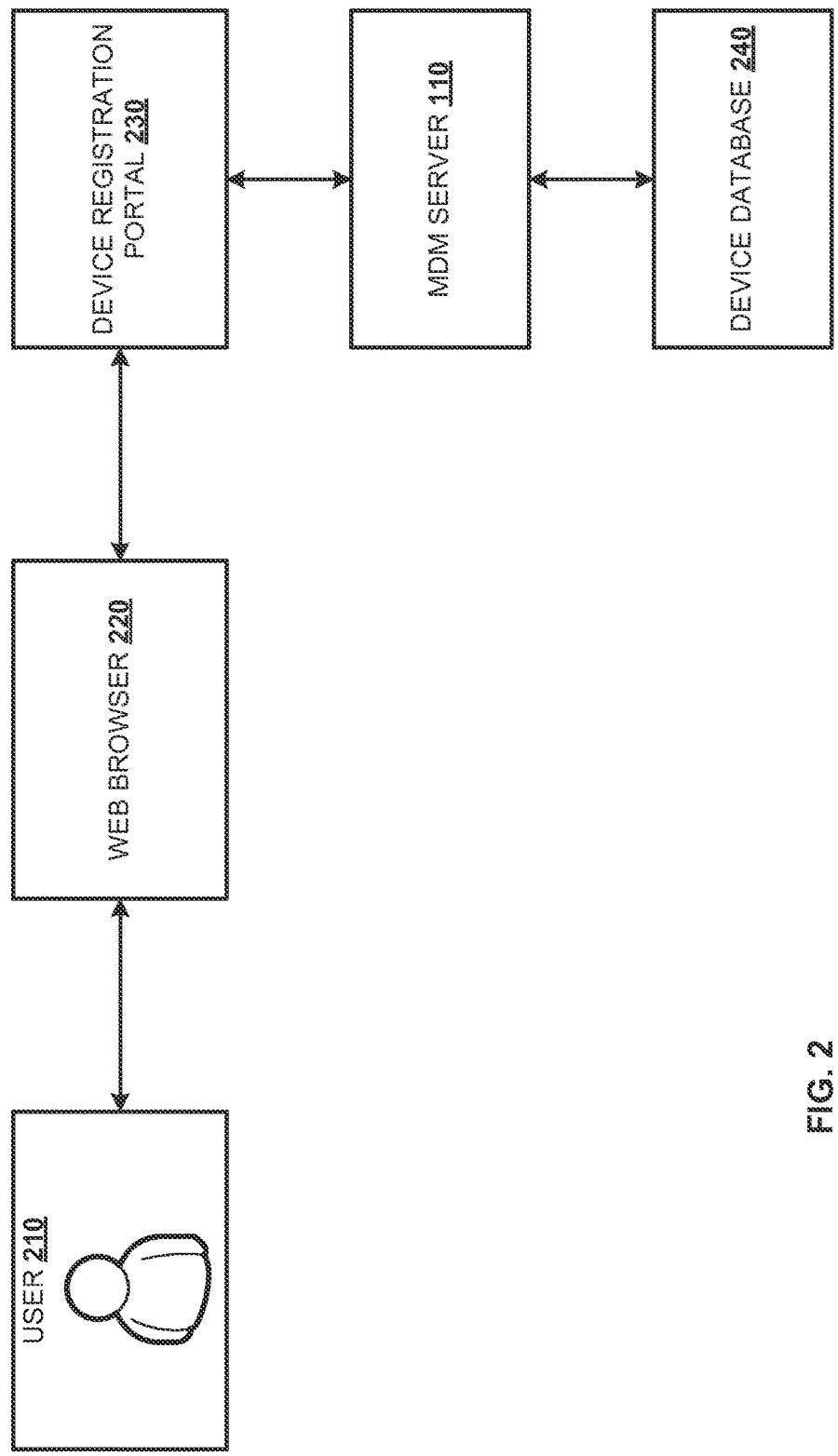
FIG. 2 illustrates a device registration portal for registering devices, according to an embodiment.

FIG. 2 illustrates device registration. A user 210 can enroll or register their device (e.g., device 120 of FIG. 1), by accessing a device registration portal 230 through a web browser 220. In an embodiment, the user opens the web browser 220 from its device and access the device registration portal 230. The device registration portal 230 provides a registration link which is accessed from the device. When the link is accessed from the device, the device information (e.g., UDID and IMEI) is automatically retrieved by the MDM server 110 from the OS of the device. In an embodiment, the device registration portal 230 may include fields for entering device information for registration and the information is entered or provided by the user 210. In an embodiment, the device registration portal 230 may be accessed from any other device and the information of the device to be registered may be entered. The information of the device to be registered is sent to the MDM server 110. Once the device information is received by the MDM server 110, the MDM server 110 registers the device and stores the device information in a device database 240. In an embodiment, the device can be enrolled or registered at any time before entering the restricted area (e.g., the restricted area 130 of FIG. 1). An unique ID may be assigned to the registered device. In an embodiment, the device registration portal 230 may inquire user's information such as name and ID of the user owning the registered device or device to be registered.

The MDM server 110 stores the registered device information in the device database 240. The device database 240 may also include a field to indicate the user owing the device. In an embodiment, the MDM server 110 includes the user database (e.g., active directory) to store information of users such as employees of an organization. In an embodiment, the user database may be maintained by its corresponding organization. The MDM server 110 can access the user database. In an embodiment, the user database may also include a field referring to another database (e.g., device database 240 of FIG. 2) that stores information of the devices owned by the user. In an embodiment, the device database 240 stores information related to the registered device and identification of the user, e.g., name or ID of the user, owing the corresponding registered device. The area specific policy related to any area can be executed on the registered device. The area specific policy includes one or more rules for changing the configuration of the device to make the device complaint to access the restricted area.

The MDM server 110 maintains a policy database to store area specific policies corresponding to one or more accessible areas (e.g., secured or restricted areas). The area specific policy refers to one or more rules that has to be complied for entering the accessible area. The area may be uniquely identified by their unique ID and/or name. An exemplarily policy database table to store one or more area specific policies corresponding to the respective areas (e.g., area A1-area A6) may be shown below as TABLE 1:

TABLE 1

| Area ID | Area Specific policy |
|---|---|
| A1 | Camera off |
| A2 | Wi-Fi & Camera off |
| A3 | Radio off & Bluetooth off |
| A4 | Recorder on & Camera off |
| A5 | Internet connectivity off & Device on silent mode |
| A6 | Alarm off & Notifications off |
| A7 | Disable device features |
| A8 | Wi-Fi off & Camera off & recorder off |
| A9 | Authenticate user & Wi-Fi off |

In an embodiment, the area specific policies for areas are configured by a user, e.g., an administrator.

Figure 3:
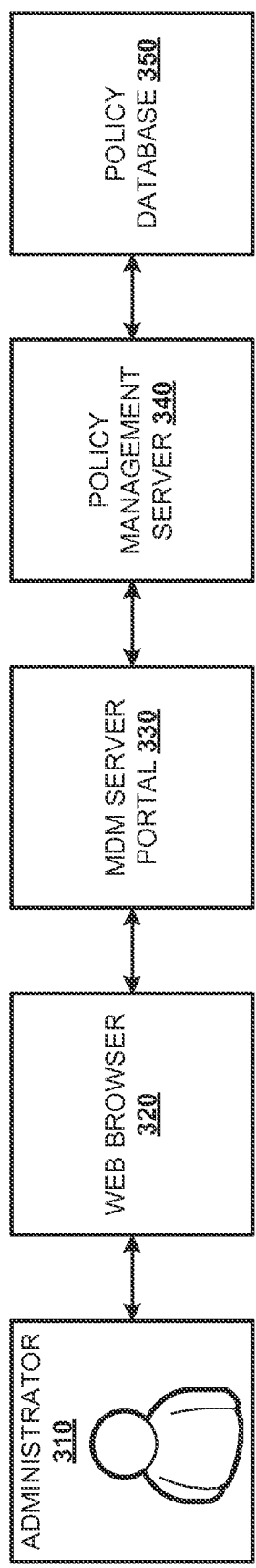
FIG. 3 illustrates a MDM server portal for managing configuring policies for corresponding areas, according to an embodiment.

FIG. 3 shows a block diagram for configuring one or more area specific policies for corresponding areas. An administrator 310 configures the area specific policies for areas through a server portal, e.g., through an MDM server portal 330. The MDM server portal 330 is accessed through a web browser 320. Once the MDM server portal 330 is accessed, the administrator 310 can configure or edit policies for various areas. The configured policies are maintained by a policy management server 340. The policy management server 340 may be a part of the MDM server 110 or may be a separate unit communicatively coupled to the MDM server 110. In an embodiment, the policy management server 340 receives the configured policies through the MDM server 110. The policy management server 340 stores the area specific policies in the policy database 350, e.g., the policy database TABLE 1 shown above.

In an embodiment, the policy database 350 may also include other information related to the areas and policies such as an in-charge of the area etc. In an embodiment, there may be another database storing possible sets of rules configured corresponding to respective policy. An identifier (ID) may be assigned to respective area specific policy. An exemplarily database table to store the sets of rules corresponding to respective policy may be shown below as TABLE 2:

TABLE 2

| Policy ID | Policy rules |
|---|---|
| P1 | Camera off |
| P2 | Wi-Fi off & Camera off |
| P3 | Radio off & Bluetooth off |
| P4 | Recorder on & Camera off |
| P5 | Internet connectivity off & Device in silent mode |
| P6 | Alarm off & Notifications off |
| P7 | Disable device features |
| P8 | Wi-Fi off & Camera off & Recorder off |
| P9 | Authenticate user |

The administrator may select the policy from the database table (e.g., TABLE 2 shown above) for the corresponding areas. In an embodiment, the administrator can also define new policy or edit old policy for an area. There can be several other formats or ways for storing area specific (security) policies. An exemplarily database table to store the selected policy corresponding to respective area may be shown below as TABLE 3:

TABLE 3

| Area ID | Policies |
|---|---|
| A1 | P7 & P9 |
| A2 | P4 |
| A3 | P5 |
| A4 | P8 |

As shown in TABLE 3, for area A1 the applicable policies are P7 and P9 to allow the device in the area A1 when the features of the device are disabled (it may be a substitute for submitting the device at security for confidential labs or meetings) and the user is authenticated (e.g., by inquiring the name and ID number of the user to allow only the selected users to enter the area A1). For area A2, the selected policy is P4 to allow the device in the area A2 when the device camera is off and device recorder is on (e.g., to automatically record the meeting). Similarly, for area A3, the selected policy is P5 to allow device in the area A3 when the device internet connectivity is off and the device is in silent mode (e.g., to avoid disturbance in any urgent meeting). For area A4, the selected policy is P8 to allow the device in the area A4 when device Wi-Fi is off, device camera is off, and the device recorder is off (e.g., to disable recording of confidential meeting).

In an embodiment, the area specific policies for the restricted area may be different for different users. For example, the area specific policies for the restricted area may be different for a security head. In an embodiment, the area specific policies are predefined for the restricted area based upon user profile (e.g., user's designation, age, marital status, etc.). For example, for the same restricted area different area specific policies may be defined for different user's group such as managers, team leaders, etc. An exemplarily database table to store the policy corresponding to respective area based upon different user groups may be shown below as TABLE 4:

TABLE 4

| Area ID | Group ID | Policies |
|---|---|---|
| A1 | G1 | P7 |
| A1 | G2 | P4 |
| A1 | G3 | P5 |
| A2 | G1 | P8 |

As shown in TABLE 4, for area A1 the applicable policy is P7 when the area A1 is accessed by the user belonging to the group G1, the applicable policy is P4 when the area A1 is accessed by the user belonging to the group G2, and the applicable policy is P5 when the area A1 is accessed by the user belonging to the group G3. Similarly, for the area A2 the applicable policy is P8 when the area A2 is accessed by the user belonging to the group G1.

The area is secured and can be accessed upon complying with the area specific policies applicable for the area. For example, the restricted area 130 (FIG. 1) can be accessed upon complying with the policy (e.g., policy P1) configured for the restricted area 130. The area has the entry point through which the area is accessible. The tag may be attached to the entry point (e.g., a security gate) of the area. The area may be secured or restricted using the access controller (e.g., lock) at the entry point of the area. For example, the restricted area 130 is secured by using the access controller 140 at the entry of the restricted area 130. The tag (e.g., tag 150) is attached to the access controller (e.g., the access controller 140). The tag can be any acceptable tag known in art such as NFC tag, QR code, bar code, RFID tag, etc. The tag (e.g., tag 150) is configurable and the administrator preconfigures the tag with information (ID or name) of the restricted area secured by the tag. The tag can also include instructions or comments. For example, the tag 150 might include a command to execute an application such as a MDM application to connect to the MDM server. The tag 150 (i.e., the information and instructions on the tag 150) can be read by a corresponding tag reader (e.g., the tag reader 160). In an embodiment, the tag such as NFC tag. QR code, bar code, RFID tag, etc., has their respective tag reader that can read these tags.

Based upon the type of tag used in an organization, the users may be required to install or download corresponding tag reader on their registered device (e.g., when the tag reader is not available on the device by default). In an embodiment, upon registering the device, the MDM server 110 automatically installs appropriate tag reader on the device. In an embodiment, upon successful registration of the device, the administrator installs the appropriate tag reader on the device. In an embodiment, the device may be pre-packaged with one or more available tag readers such as NFC reader, bar code reader, RFID reader, etc. The tag reader (e.g., tag reader 160 of FIG. 1) can read the corresponding tag (e.g., tag 150 of FIG. 1). In an embodiment, reading the tag refers to reading the information and instruction stored within the tag.

When the device 120 (FIG. 1) gets near the access controller 140 (e.g., the device 120 is swiped at the security gate or the access controller 140), the tag reader 160 within the device 120 reads the tag 150. For example, the tag reader 160 reads the area ID from the tag 150 and reads the command from the tag 150. The command may be to execute the application (e.g., SAP Afaria®) on the device 120 to get connected to the MDM server 110. In an embodiment, the tag reader 160 sends the information (e.g., area ID) and the command to the OS of the device 120. The OS executes the command, e.g., runs the application to get connected to the MDM server 110.

Once the device 120 gets connected or communicatively coupled to the MDM server 110, the OS of the device 120 sends the area ID to the MDM server 110. In an embodiment, the OS of the device 120 sends device ID to the MDM server 110. The MDM server 110 authenticates the device using the device ID to determine if the device 120 is registered/enrolled. In an embodiment, the MDM server 110 retrieves information related to the device from the OS of the device and based upon the retrieved device information, determines whether the device is the registered device (e.g., by mapping the device information in the device database). Upon successful authentication, the MDM server 110 retrieves area specific policy (e.g., P1) corresponding to the area ID. The area specific policy corresponding to the area ID is sent to the device 120 or the OS of the device 120. The OS of the device 120 executes the area specific policy (e.g., switching off device camera) on the device 120. When the area specific policy is executed on the device 120, the configuration of the device 120 is changed or switched to make the device 120 complaint with the area specific policy. The OS sends the confirmation message to the MDM server 110 that the area specific policy is executed on the device 120 and the device 120 is complaint with the area specific policy to access the restricted area 130.

In an embodiment, before authenticating the device, the MDM server 110 authenticates the user. The MDM server 110 may inquire the user about its ID and name through the application. The MDM server 110 determines whether the user is authenticated or registered user by mapping the received user ID and name with the user database (e.g., active directory). When the user authentication is unsuccessful, the MDM server 110 sends the error message that the user is unauthorized and cannot access the area. The error message may be displayed on the device. The MDM server 110 also instructs the access controller (e.g., lock) to be closed. In an embodiment, when the authentication is unsuccessful for a predefined number of times (e.g., 4 times) for a user, the MDM server 110 reports the administrator that some unauthorized user tried entering the area (area ID) 4 times. The number of times may be predefined or configured by the administrator. In an embodiment, when the user authentication is successful, the user may be allowed to enter the area. The user attendance and movement can be tracked/maintained. Further, the user need not carry separate ID card for authentication, attendance, or entry, rather, through its device itself the user can be authenticated and allowed within the premise.

Figure 4:
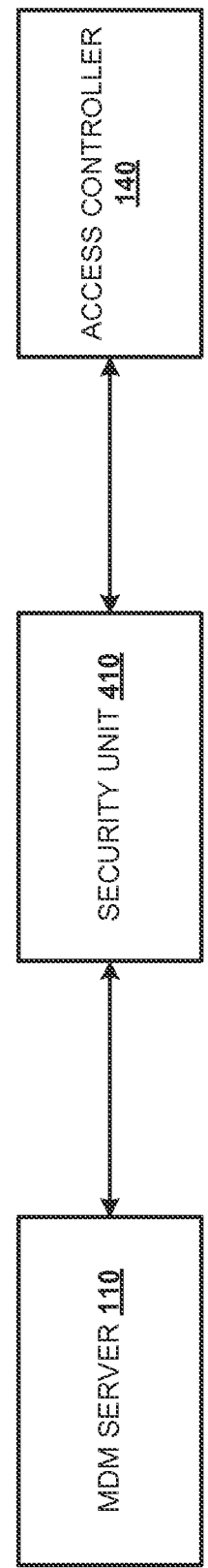
FIG. 4 illustrates a security unit for controlling access in a restricted area, according to an embodiment.

In an embodiment, when the user authentication is successful, the MDM server 110 authenticates the device 120 based upon the device information received from the OS of the device 120. When the device 120 is authenticated, the MDM server 110 retrieves area specific policy applicable to the area ID (e.g., corresponding to the restricted area 130) received from the device 120. The area specific policy is retrieved from the policy database. The MDM server 110 sends the retrieved area specific policy to the OS of the device 120. In an embodiment, prior to sending the retrieved area specific policy, the MDM server 110 checks a profile of the user (e.g., user's designation) carrying the device and changes or edits the retrieved area specific policy based upon the user profile. The edited area specific policy is then sent to the OS of the device 120. In an embodiment, the area specific policy is retrieved from the database that stores the area specific policy corresponding to the restricted area and/or user's profile (e.g., the database or TABLE 4 shown above). The OS executes the area specific policy on the device 120 and sends the confirmation message to the MDM server 110 that the area specific policy is executed and the device 120 is now compliant with the area specific policy. Upon receiving the confirmation message, the MDM server 110 directly instruct the access controller 140 to get opened and the user can enter the restricted area 130 along with the device 120. In an embodiment, as shown in FIG. 4, the MDM server 110 is communicatively coupled to a security unit 410 which is responsible for controlling (e.g., opening/closing) the access controller 140. In an embodiment, the security unit 410 may be a separate unit positioned outside the MDM server 110 such as a security unit within an organization. In an embodiment, the security unit may be a part of the MDM server 110. The security unit 410 is instructed by the MDM server 110 to open the access controller 140 and the security unit 410 opens the access controller 140 to allow the user enter the restricted area 130 along with the device 120.

In an embodiment, when the user tries to come out of the restricted area, the user flashes or swipes the device 120 at the entry or exit gate to open the gate from inside. Upon swiping the device 120 from inside, the user and device authentication is not required again as it is already authenticated. The access controller at the exit or entry gate is instructed to get open by the security unit 410. The security unit 410 stores the device ID, e.g., when the user enters the area along with the device, the device ID is stored by the security unit 410 and when the device is swiped from inside, the security unit 410 identifies the device and instruct the access controller to get opened. In an embodiment, the access controller at the exit or entry gate is instructed to get open by the MDM server 110. In an embodiment, the access controller is instructed (e.g., by the security unit 410 or the MDM server 110) to get opened whenever the device is swiped from inside.

In an embodiment, once the exit gate is opened and the user is out, the device configuration is reverted back to the original configuration. In an embodiment, the application (e.g., SAP Afaria®) stores the modified device configuration locally on a local device database and once the user is out of the restricted area, the application instruct the OS of the device 120 to revert to the original configuration or call off (withdraw) the modified configuration. Therefore, without connecting to the MDM server 110, the device configuration can be reverted to the original configuration, once the user is out of the restricted area. In an embodiment, the MDM server 110 instructs the OS of the device 120 to revert to the original configuration once the user is out of the restricted area.

Figure 5:
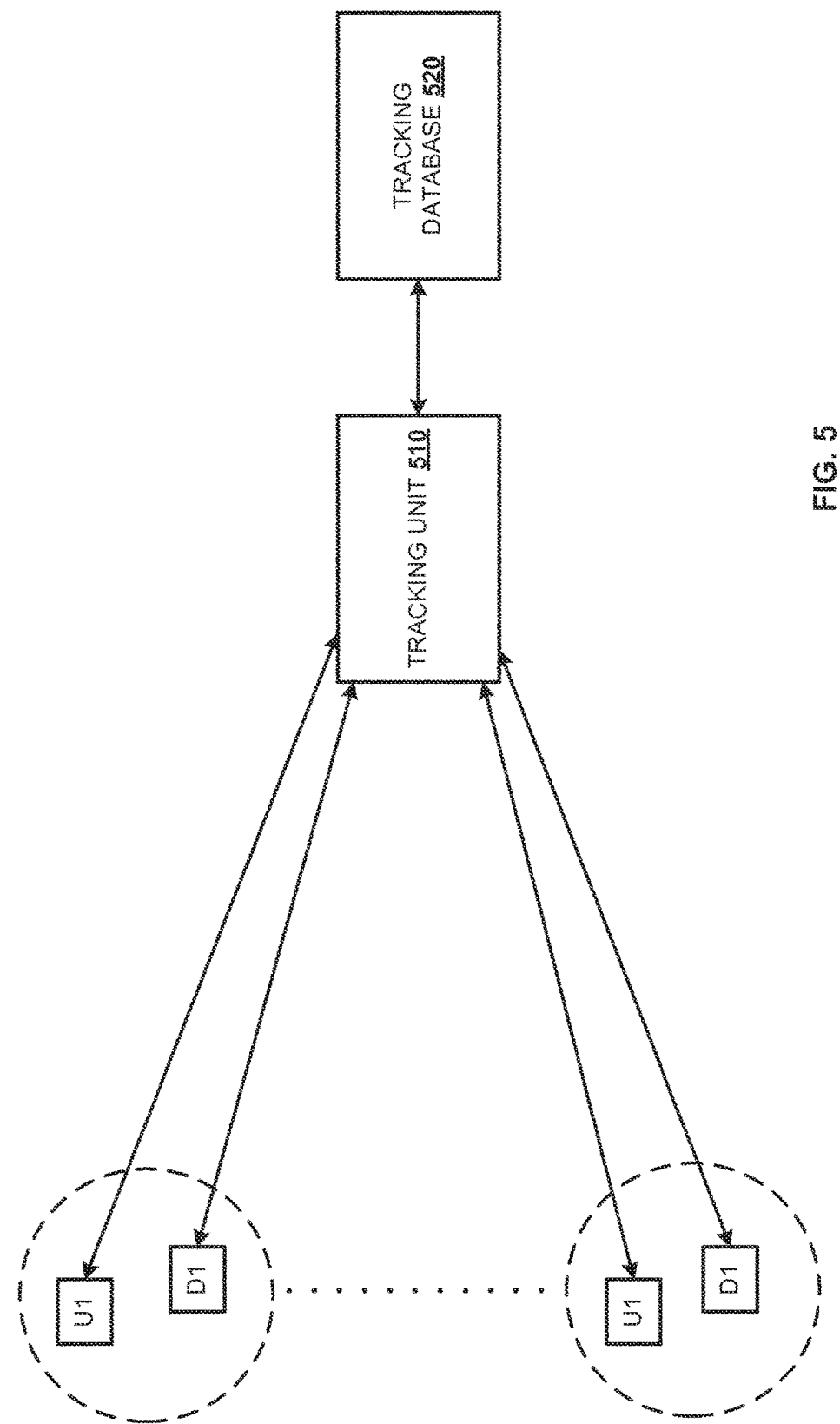
FIG. 5 illustrates a tracking unit for tracking registered users and devices, according to an embodiment.

The embodiments enable to determine whether the user attended meetings organized in the restricted area (e.g., restricted area 130) and how many times user attended the respective meeting. The device and user movement can be tracked. FIG. 5 shows a tracking unit 510 which tracks registered devices (e.g., device D1-device DN) and registered users (e.g., user U1-user UN). In an embodiment, the tracking unit may be a tracking server. The tracking unit 510 may be a part of the MDM server 110 or may be a separate unit positioned outside the MDM server 110. The tracking unit 510 is communicatively coupled to the MDM server 110. The tracking unit 510 inquires the MDM server 110 to determine the registered users and devices and then keeps tracking the registered devices and users. In an embodiment, the administrator may provide ID of the users and devices that has to be tracked and the tracking unit 510 tracks the requested users and devices. The tracking unit 510 records or stores the tracking information related to the users and devices in a tracking database 520. In an embodiment, there may be separate databases for user tracking and device tracking. The tracking database 520 may include columns such as user/device ID, area ID, time stamp, and IN/OUT to store tracking information. An exemplarily tracking database table to store the tracking information may be shown below as TABLE 5:

TABLE 5

| User/Device ID | Date/Time | Area ID | IN/OUT |
|---|---|---|---|
| D1 | 12/12/2003 - 20:00 PM | A3 | IN |
| U1 | 12/12/2003 - 22:00 PM | A1 | OUT |
| D1 | 13/12/2003 - 10:00 AM | A6 | IN |

The tracking information may be provided to the administrator. For example, the tracking information related to the device D1 may be provided as D1→[(12/12/2003—20:00 PM, A3) (13/12/2003—10:00 AM, A6)]. There may be various different formats and ways for representing or maintaining the tracking information. In an embodiment, the application on the device itself tracks the movement of the device and records the tracking information. The application stores the tracking information locally on a device local database and uploads the tracking information onto the tracking unit 510 or the MDM server 110 at a predefined scheduled time. The predefined scheduled time is configured by the user, e.g., the administrator. When the tracking information is uploaded to the MDM server 110, the MDM server 110 communicates the uploaded tracking information to the tracking unit 510. In an embodiment, the tracking information is uploaded whenever network connectivity with the MDM server 110 or the tracking unit 510 is available and the device is sufficiently charged. Therefore, the device can also be monitored or tracked without network connectivity with the MDM server 110 or the tracking unit 510. The tracking unit 510 stores the received tracking information in the tracking database 520. In an embodiment, the tracking unit 510 may be configured to clear tracking information from the tracking database 520 after a predefined time interval. The predefined time interval may be configured, e.g., by the administrator.

In an embodiment, if the device 120 is authenticated and the policies are applied on the device 120, e.g., for the restricted area 130, the area 130 ID and the area specific policies related to the area 130 are cached from the MDM server 110 and stored on the device local database. The administrator might configure a policy such that if the device is authenticated and complaint for entering the restricted area once, the device can enter the restricted area for a predefined time interval without authentication, i.e., without connecting to the MDM server 110. The user/device access right is persistent for the predefined time interval. Therefore, the access to the restricted area becomes faster. The area specific policies are cached on the device 120 (e.g., stored in device local database) and are executed on the device 120 whenever the device 120 enters the restricted area 130 within the predefined time interval. Therefore, the device can enter the restricted area without being connected to the MDM server 110.

The application on the device 120 reads the cached securities policies from the device local database and instructs the OS of the device 120 to apply the area specific policies on the device 120 while entering the restricted area 130. Therefore, connectivity with the MDM server 110 may not be required every time. In case the policy related to the restricted area 130 is violated, the application sends an alert to the MDM server 110 and/or to the administrator that the policy related to the area is violated/breached. Upon receiving the alert, the MDM server 110 and/or the administrator can take necessary action, e.g., block the user from entering/leaving the area.

In an embodiment, the area specific policy may be cached for a predefined time period configured by the administrator, e.g., 9 hours or office hours, etc. In an embodiment, in case the policy related to the restricted area 130 gets changed/edited, then the MDM server 110 notifies to a notification server (not shown) and the notification server notifies the application/device 120 that the cached area specific policies are invalidated or edited. Once the device 120 receives the notification, the cached area specific policies are invalidated and the device 120 gets connected to the MDM server 110 for authentication to enter the restricted area 130.

Figure 6:
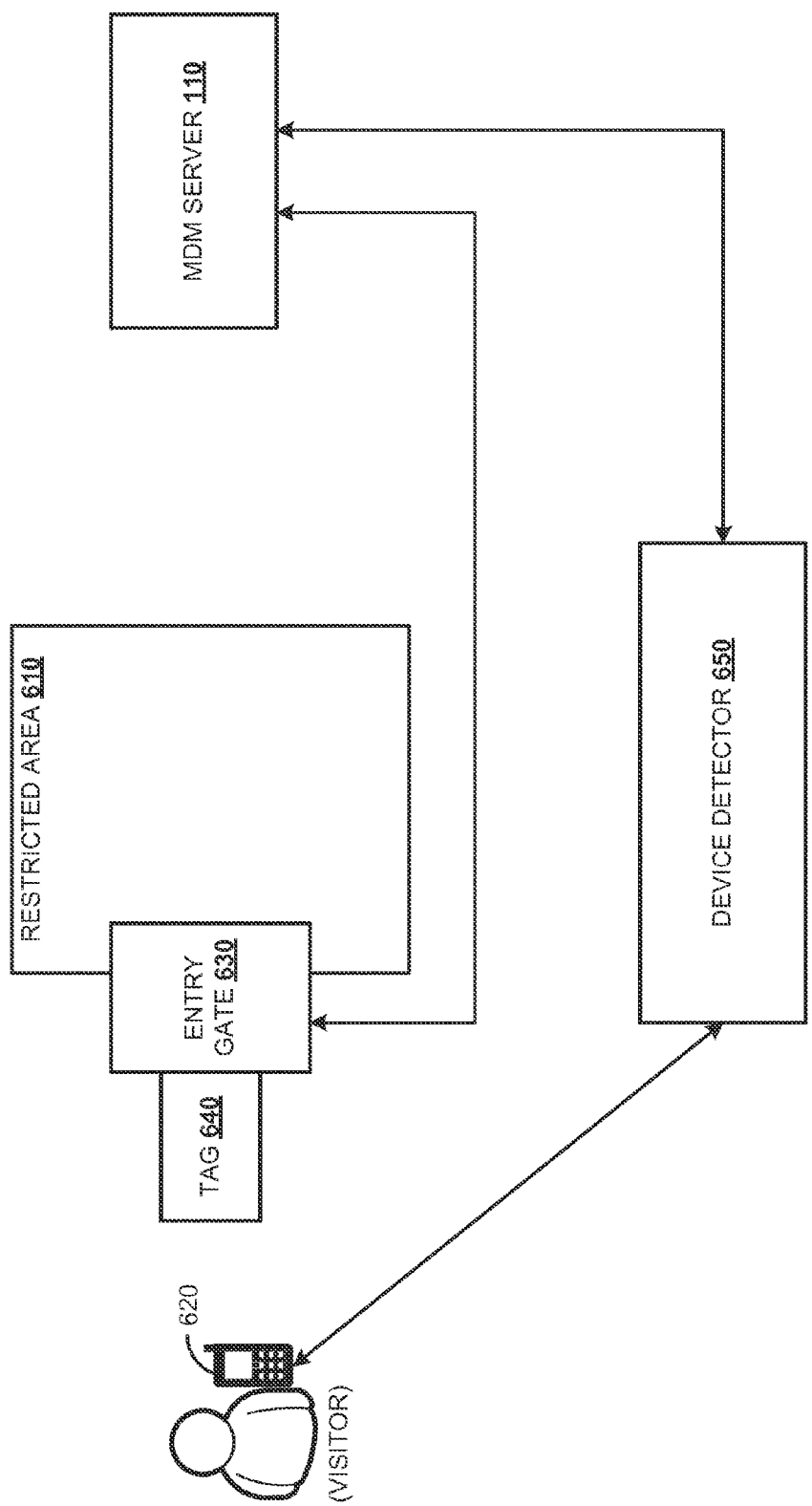
FIG. 6 illustrates a time based access in a restricted area, according to an embodiment.

FIG. 6 shows an example of time based access within a restricted area 610. The restricted area 610 may be a secured room (e.g., a lock-up or jail room) where a visitor is allowed to enter for a specified time period. When visitor comes near an entry gate 630, a device detector 650 detects whether the visitor is carrying any device. In an embodiment, the device detector 650 may be a metal detector which can detect the device even when the device is switched off. In case no device is detected, the device detector 650 sends message to the MDM server 110 requesting to open the entry gate 630. Upon receiving the message, the MDM server opens or unlocks the entry gate 630 and the visitor can access the restricted area 610. In case the device (e.g., device 620) is detected, the entry gate 630 is not opened. The visitor is then required to flash the device 620 on an entry gate 630. The entry gate 630 includes a tag 640. As the device 620 (e.g., mobile phone) is flashed, a tag reader on the device 620 reads the tag 640. In case the device does not include a tag reader, the device cannot be swiped or flashed (e.g., red dot at entry gate does not show any response) and the visitor can contact a responsible person, get its device checked or submitted and can enter the restricted area 610 without the device.

In case the device 620 includes the tag reader, the tag reader reads the tag 640 and the device 620 gets connected to the MDM server 110. The MDM server 110 retrieves the device information such as device ID and other details from the OS of the device 620 and stores the retrieved information in a visitor database (not shown). The visitor database includes information such as the time visitor entered the restricted area, visitor's device details if the visitor is carrying the device, etc. Therefore, the visitor can be tracked. In an embodiment, the MDM server 110 sends the policies applicable for the restricted area 610 (e.g., camera off, recorder off, etc.) to the device 620. The OS of the device 620 executes the received area specific policies on the device 620. Once the area specific policies are executed, the device 620 informs the MDM server 110 to open the entry gate 630. The MDM server 110 opens the entry gate 630 and the visitor can enter the restricted area 610. As there is a time limited access or predefined time (e.g., 30 minutes from the time visitor entered the restricted area), the area specific policy may be predefined to beep an alarm on the visitor's device 620 once the predefined time is lapsed. In an embodiment, when the predefined time is lapsed, an administrator, e.g., jailer, is informed by the MDM server 110.

Figure 7:
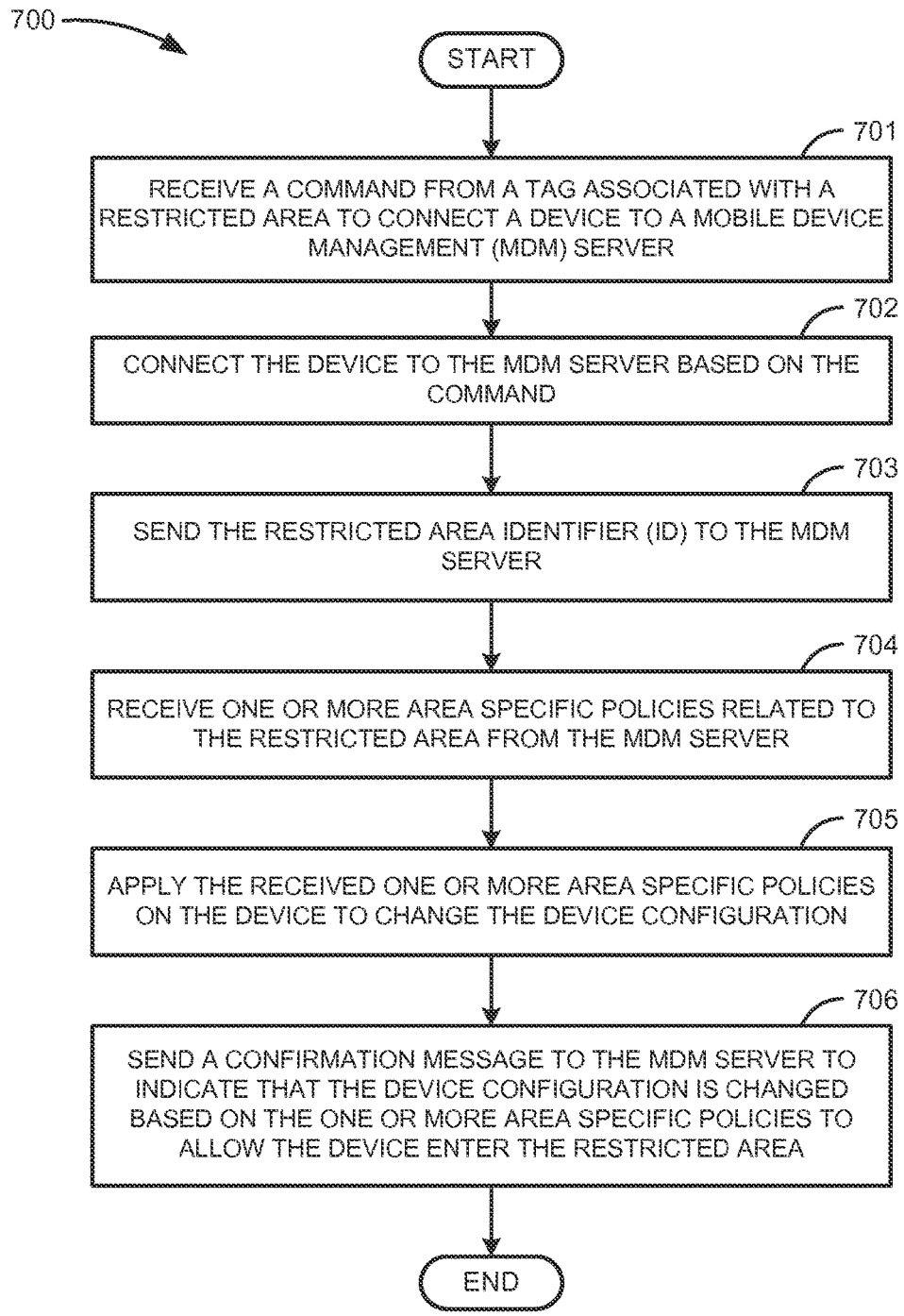
FIG. 7 is a flowchart illustrating a process of switching device configuration based upon area specific policies in a restricted area, according to an embodiment.

FIG. 7 is a flowchart illustrating process 700 to change device configuration based upon area specific policies of a restricted area (e.g., restricted area 130 of FIG. 1) where a device (e.g., device 120 of FIG. 1) is to be entered. The device to be entered in the restricted area is identified. The restricted area is restricted using a tag (e.g., tag 150 of FIG. 1) on an entry gate of the restricted area. In an embodiment, the tag is attached to a lock (e.g., access controller 140 of FIG. 1) placed at the entry gate to secure the restricted area. At 701, a command is retrieved or received from the tag to connect the device to a mobile device management (MDM) server (e.g., MDM server 110 of FIG. 1). In an embodiment, the command is received to execute an application (e.g., SAP Afaria®) to connect the device to the MDM server. In an embodiment, the tag is preconfigured with an ID of the restricted area and the command to connect the device (to be entered in the restricted area) to the MDM server. The restricted area ID and the command is read by a tag reader (e.g., tag reader 160 of FIG. 1) installed on the device. At 702, based upon the read command, the application is executed to connect the device to the MDM server. At 703, the restricted area ID is sent to the MDM server.

At 704, one or more area specific policies related to the restricted area are received from the MDM server. In an embodiment, the server stores preconfigured area specific polices related to one or more restricted areas. In an embodiment, the area specific policies can be reconfigured or edited by a user. e.g., an administrator. At 705, the received one or more area specific policies are applied or executed on the device to change the device configuration based on the received one or more area specific policies. For example, the device camera may be switched off, the device recorder may be switched on, etc. At 706, a confirmation message is sent to the MDM server to indicate that the device configuration is changed based on the received one or more area specific policies to allow the device enter the restricted area. Upon receiving the confirmation message, the MDM server sends instruction to open the entry gate to allow the device within the restricted area. In an embodiment, the MDM server directly sends signal to open the entry gate. In an embodiment, the MDM server may instruct the security unit (e.g., security unit within an organization) to open the entry gate.

Figure 8:
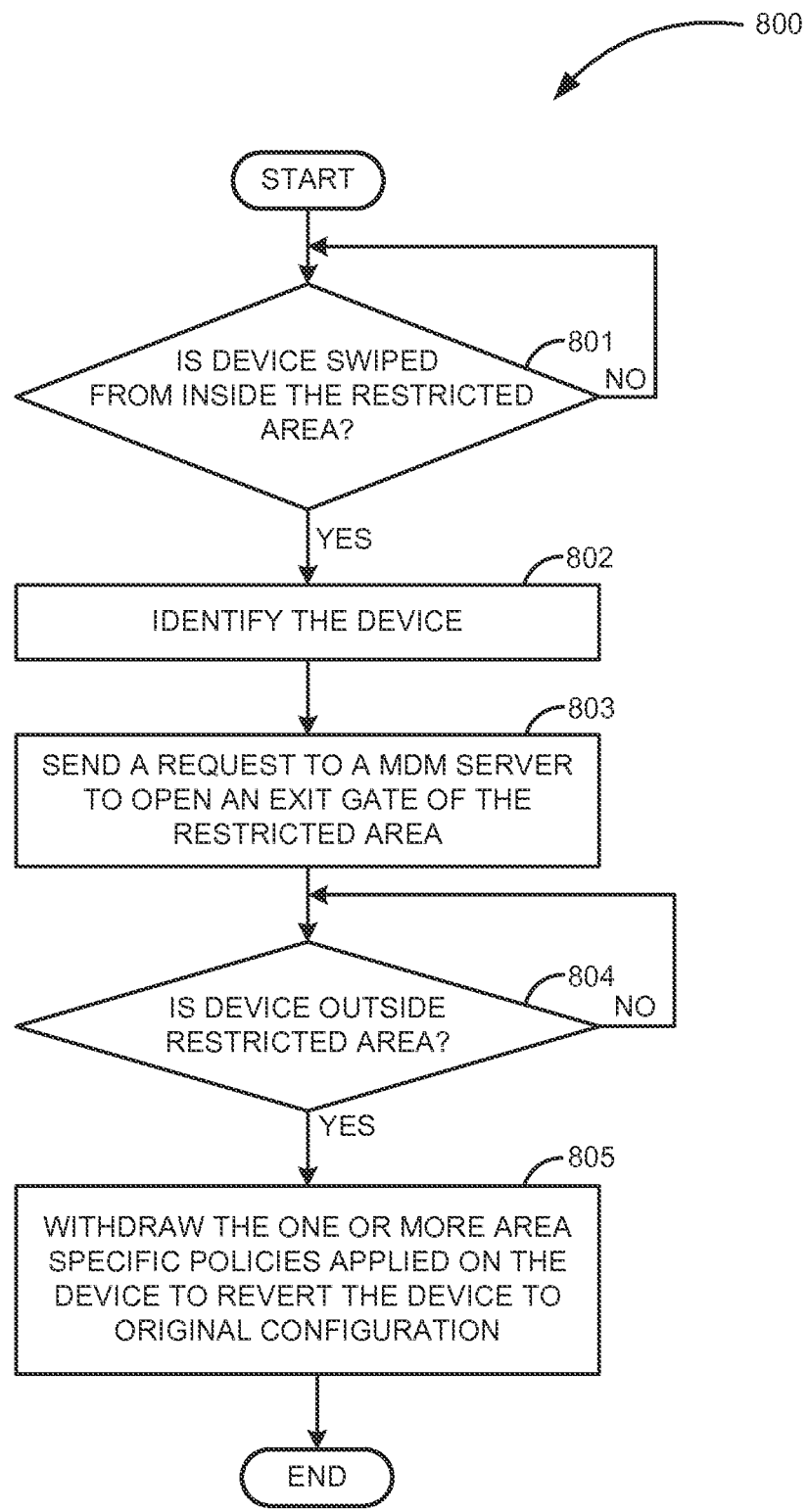
FIG. 8 is a flowchart illustrating a process of reverting to device original configuration outside a restricted area, according to an embodiment.

FIG. 8 is a flowchart illustrating process 800 to allow device outside the restricted area and revert to device original configuration. At 801, it is determined whether the device is swiped from inside the restricted area. In an embodiment, the entry gate itself may be the exit gate when swiped from inside. When the device is swiped from inside (801: YES), the device is identified, at 802. The device is identified by the MDM server or the security unit. The MDM server and/or the security unit may maintain a register of the devices which entered the restricted area. At 803, a request is sent to the MDM server to open the exit gate for the identified device to allow the device outside the restricted area. In an embodiment, the request may be send to the security unit directly. At 804, it is determined whether the device is outside the restricted area. When the device is outside the restricted area (804: YES), the one or more area specific policies applied on the device are withdrawn and the device is reverted to the original configuration, at 805.

Embodiments enable to automatically and dynamically change the device configuration based upon the area specific (security) policy of an area before allowing the device within the area. The securities policy may be just related to authentication and in that case, the user and/or device are just authenticated before allowing the user/device within the area without configuring or re-configuring the device. Therefore, the user may not need to carry a separate ID card for attendance or entry, rather the device itself acts like an ID card. The security mechanism is automated and security guards may not be separately required for corresponding areas which saves cost and is free of manual error(s). The embodiments also help to track the movement of the authorized user/device. The tracking information may be reported to the administrator. In an embodiment, when the authentication fails for a predefined number of times (e.g., 4 times), the administrator is informed that some unauthorized user tried entering the area $4^{th}$ time.

The area specific policy related to an area is automatically and dynamically executed on the authenticated device to allow the device within the area. The policy corresponding to areas may be easily configured or edited by the administrator. In case the policy is not to allow any device within a confidential lab or meeting, the device is automatically disabled and the user can, therefore, still carry the device as the device is non-functional. Therefore, the user is not required to submit/deposit its device anywhere, e.g., at security, which might be insecure and non-reliable. The time restricted policy can be configured for the restricted area to allow visitors to enter the area for a specified time interval. When the specified time is lapsed, an alarm may be blown or trigged on the user's (e.g., visitor's) device and the administration is informed about the time lapse as well. In some area (e.g., museum and expos), the authentication part may be ignored and just the area specific policies may be executed or applied on the device to let the device enter the area.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
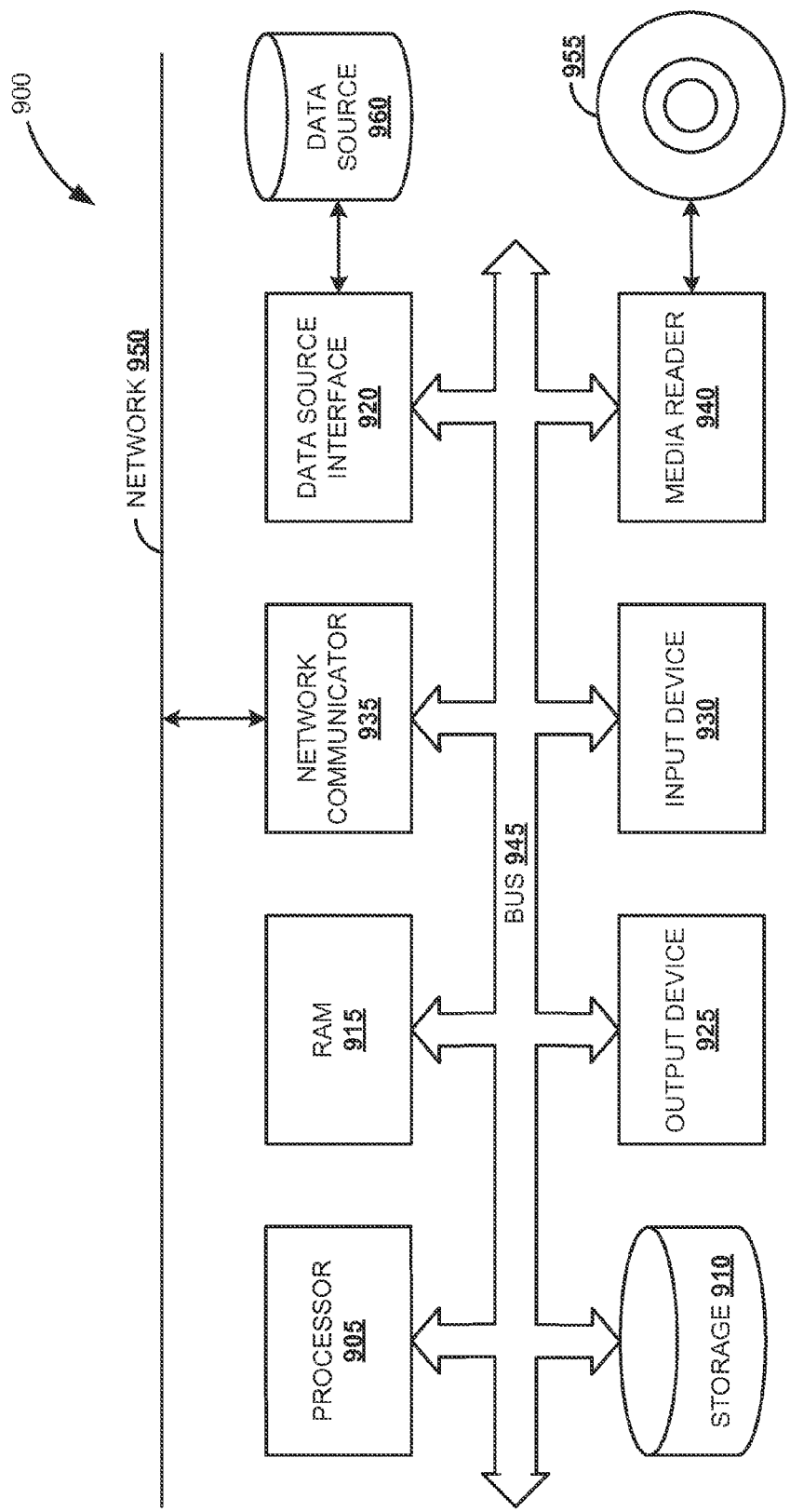
FIG. 9 is a block diagram illustrating an exemplary computer system, according to an embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. The output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to perform operations comprising:
   at a device, receive a command from a tag to connect the device to a mobile device management (MDM) server;
   based on the command, connect the device to the MDM server;
   automatically install a tag reader on the device corresponding to the tag upon successful registration of the device;
   send a restricted area identifier (ID) identifying a restricted area to the MDM server;
   from the MDM server, receive one or more area specific policies for the restricted area;
   apply the received one or more area specific policies on the device to change configuration of the device; and
   send a confirmation message to the MDM server to indicate that the configuration of the device is changed based on the one or more area specific policies, to allow the device to enter the restricted area.

2. The computer readable medium of claim 1, wherein the tag is adjacent to an entry gate of the restricted area.

3. The computer readable medium of claim 1, wherein the restricted area ID and the command are read from the tag through a tag reader installed on the device.

4. The computer readable medium of claim 1, wherein applying the received one or more area specific policies comprises one of switching off a camera of the device, switching off radio transmission of the device, disabling Wi-Fi connection of the device, disabling internet connection of the device, disabling the device, switching off Bluetooth of the device, switching on recorder of the device, disabling the recorder of the device, putting off alarm of the device, putting off notification on the device, authenticating a user carrying the device, putting the device in silent mode, sending an alert to an administrator and blow an alarm on the device after a predefined time period from the entry of the device in the restricted area.

5. The computer readable medium of claim 1 further comprising instructions, which when executed by the computer cause the computer to perform operations comprising:
   receive a request from the MDM server to withdraw the applied one or more area specific policies when the device is outside the restricted area; and
   based upon the received request, withdraw the applied one or more area specific policies to revert the device to original configuration.

6. The computer readable medium of claim 1 further comprising instructions, which when executed by the computer cause the computer to perform operations comprising at least one of:
   requesting a security unit to open at least one of an entry and exit gate whenever the device is swiped at one of the entry and exit gate from inside the restricted area;
   instructing an application to store the one or more area specific policies related to the restricted area in a device local database for a predefined time period once the one or more area specific policies are applied on the device to allow subsequent execution of the one or more area specific policies on the device without connecting to the MDM server whenever subsequently the device tries to enter the restricted area within the predefined time period;
   receiving a notification of change in the received one or more area specific policies;
   based upon the received notification, withdrawing the one or more area specific policies stored in the device local database and connecting to the MDM server for receiving the changed one or more area specific policies for the restricted area;
   instructing the application to track a movement of the device and store tracking information comprising at least date, time, and area ID in the device local database; and
   instructing the application to upload the tracking information onto at least one of the MDM server and a tracking unit, wherein the tracking information is uploaded after at least one of a predefined time interval and connection with the at least one of the MDM server and the tracking unit is established.

7. The computer readable medium of claim 1 further comprising instructions, which when executed by the computer cause the computer to perform operations comprising:
   upon determining that an area specific policy of the one or more area specific policies are violated within the restricted area, sending an alert to at least one of the MDM server and an administrator to inform about the violation of the area specific policy along with the restricted area ID and information of the device.

8. The computer readable medium of claim 1, wherein the device is registered with the MDM server by:
   determining whether a device registration portal is accessed from the device; and
   upon determining that the device registration portal is accessed from the device, automatically retrieving an ID of the device from an operating system of the device.

9. The computer readable medium of claim 8, wherein the device registration portal authenticates a user carrying the device prior to registering the device.

10. The computer readable medium of claim 8, wherein upon registering the device, the MDM server automatically installs a tag reader corresponding to the tag on the device.

11. A computer-implemented method for dynamically switching device configuration based upon context, the method comprising:
- at a device, receiving a command from a tag to connect the device to a mobile device management (MDM) server;
- based on the command, connecting the device to the MDM server;
- automatically installing a tag reader on the device corresponding to the tag upon successful registration of the device;
- sending a restricted area identifier (ID) identifying a restricted area to the MDM server;
- from the MDM server, receiving one or more area specific policies for the restricted area; applying the received one or more area specific policies on the device to change the device configuration; and
- sending a confirmation message to the MDM server to indicate that the device configuration is changed based on the one or more area specific policies, to allow the device to enter the restricted area.

12. The computer-implemented method of claim 11 further comprising:
- receiving a request from the MDM server to withdraw the applied one or more area specific policies when the device is outside the restricted area; and
- based upon the received request, withdrawing the applied one or more area specific policies to revert the device to original configuration.

13. A computer system for dynamically switching device configuration based upon context comprising:
- at least one memory to store executable instructions; and
- at least one processor communicatively coupled to the at least one memory, the at least one processor configured to execute the executable instructions to:
  - at a device, receive a command from a tag to connect the device to a mobile device management (MDM) server;
  - based on the command, connect the device to the MDM server;
  - automatically install a tag reader on the device corresponding to the tag upon successful registration of the device;
  - send a restricted area identifier (ID) identifying a restricted area to the MDM server;
  - from the MDM server, receive one or more area specific policies for the restricted area;
  - apply the received one or more area specific policies on the device to change the device configuration; and
  - send a confirmation message to the MDM server to indicate that the device configuration is changed based on the one or more area specific policies, to allow the device to enter the restricted area.

14. The system of claim 13, wherein the processor is further configured to execute the executable instructions to:
- upon determining that an area specific policy of the one or more area specific policies are violated within the restricted area, sending an alert to at least one of the MDM server and an administrator to inform about the violation of the area specific policy along with the restricted area ID and information of the device.

15. The system of claim 13, wherein the processor is further configured to execute the executable instructions to:
- receive a request from the MDM server to withdraw the applied one or more area specific policies when the device is outside the restricted area; and
- based upon the received request, withdraw the applied one or more area specific policies to revert the device to original configuration.

16. A computer system for dynamically switching device configuration based upon context comprising:
- at least one memory to store executable instructions; and
- at least one processor communicatively coupled to the at least one memory, the at least one processor configured to execute the executable instructions to:
  - identify a device requesting to enter a restricted area;
  - authenticate a user carrying the device by inquiring at least one of a user ID and name;
  - upon successful authentication of the user, authenticate the device based upon a device ID retrieved from an operating system (OS) of the device and mapping the retrieved device ID with IDs of devices registered with the computer system;
  - upon successful authentication of the device, send one or more area specific policies related to the restricted area to the authenticated device;
  - instruct the device to cache the one or more area specific policies related to the restricted area in a local database of the device for a predefined time period;
  and
  - upon unsuccessful authentication of at least one of the user and the device, send a command not to allow the device in the restricted area.

17. A computer system of claim 16, wherein the command is sent to one of a security unit controlling access to the restricted area and a lock attached to an entry gate of the restricted area.

18. A computer system of claim 16, wherein the processor is further configured to execute the executable instructions to:
- receive a confirmation message from the device that the device configuration is changed based on the one or more area specific policies; and
- based upon the received confirmation message, send a command to one of a security unit controlling access to the restricted area and a lock attached to an entry gate of the restricted area to allow the device in the restricted area.

19. A computer system of claim 16, wherein the processor is further configured to execute the executable instructions to:
- determine whether the device is outside the restricted area; and
- upon determining the device is outside the restricted area, send a command to the device to withdraw the applied one or more area specific policies to revert the device to original configuration.

20. A computer system of claim 16, wherein the processor is further configured to execute the executable instructions to:
- prior to sending the one or more area specific policies, determine a profile of a user carrying the device;
- based upon the user's profile, modify the one or more area specific policies; and
- send the modified one or more area specific policies to the authenticated device.

* * * * *